Figure 1:
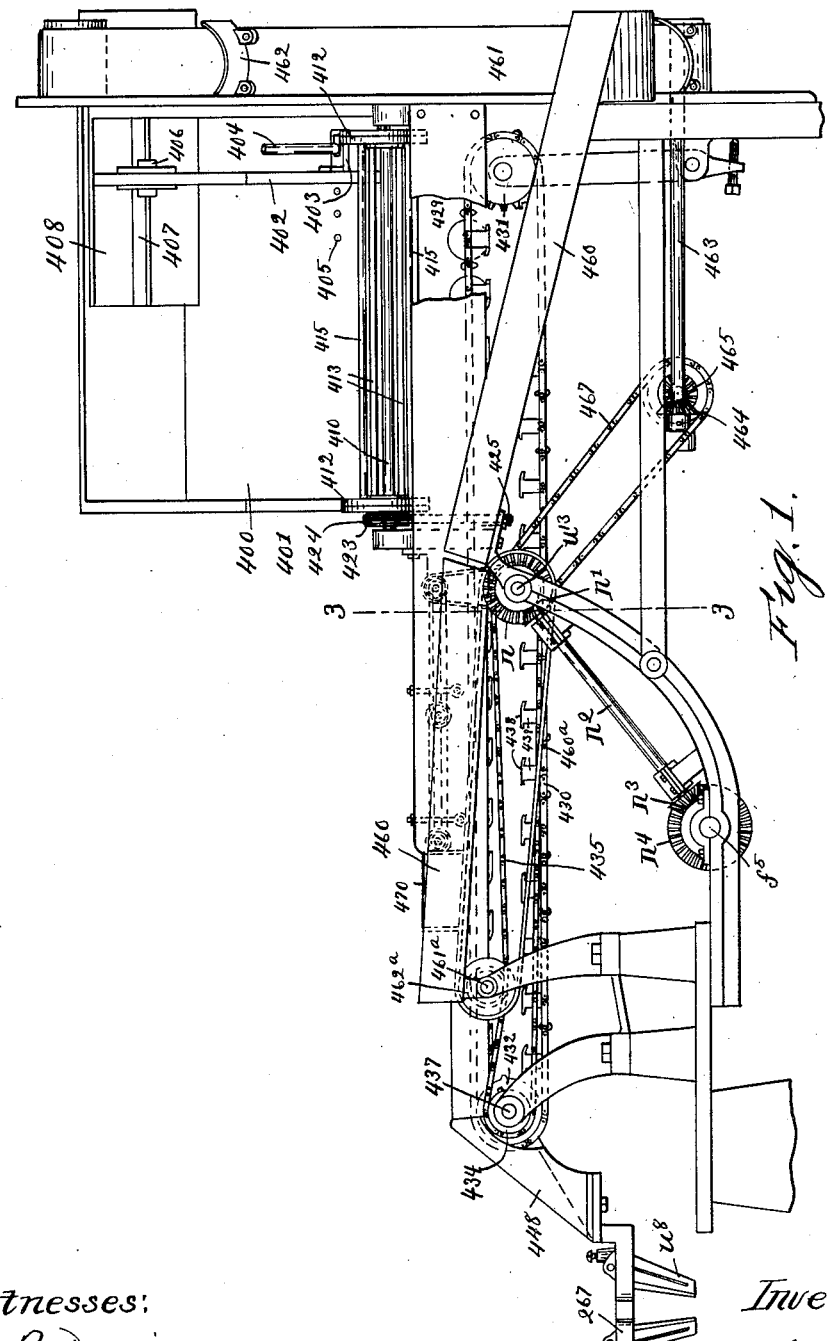

No. 820,378. PATENTED MAY 8, 1906.
M. H. BALLARD.
FEEDING DEVICE FOR ORANGES AND OTHER ARTICLES.
APPLICATION FILED NOV. 8, 1905.

4 SHEETS—SHEET 1.

Witnesses:
H. B. Davis
Cynthia Doyle

Inventor:
Milton H. Ballard
by Noyes & Harriman
attys.

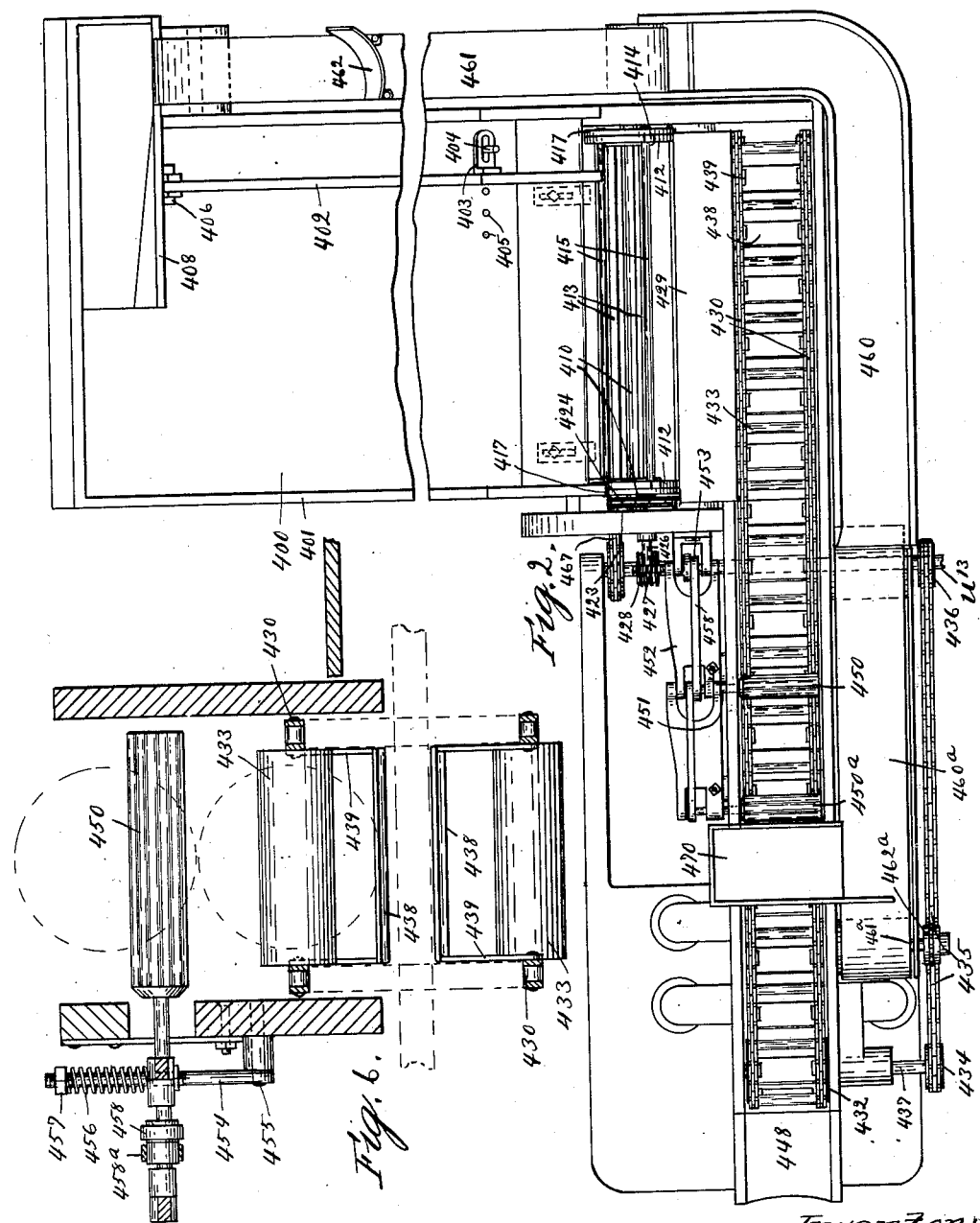

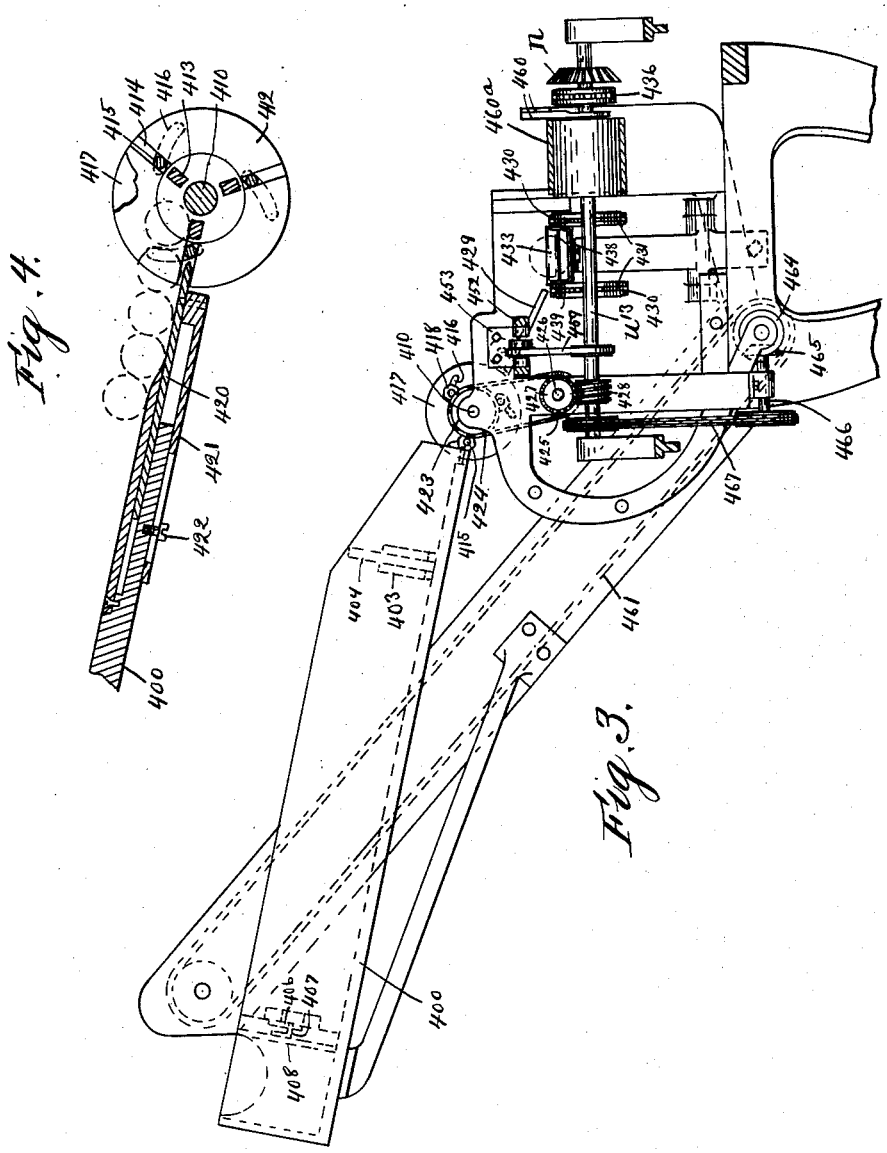

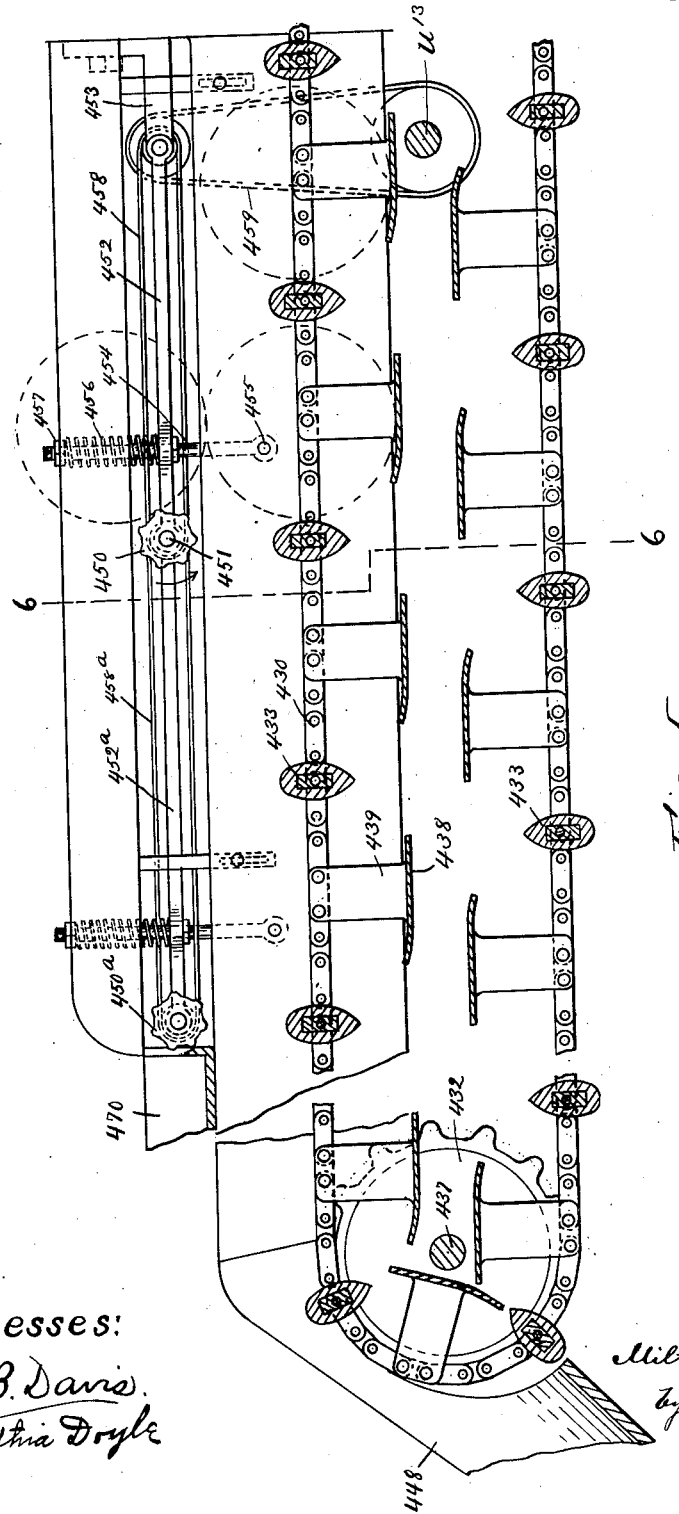

UNITED STATES PATENT OFFICE.

MILTON H. BALLARD, OF LYNN, MASSACHUSETTS, ASSIGNOR TO TRIPP FRUIT WRAPPING MACHINE COMPANY, OF LYNN, MASSACHUSETTS, A CORPORATION OF MAINE.

FEEDING DEVICE FOR ORANGES AND OTHER ARTICLES.

No. 820,378.     Specification of Letters Patent.     Patented May 8, 1906.

Application filed November 8, 1905. Serial No. 286,343.

To all whom it may concern:

Be it known that I, MILTON H. BALLARD, of Lynn, county of Essex, State of Massachusetts, have invented an Improvement in Feeding Devices for Oranges and other Articles, of which the following description, in connection with the accompanying drawings, is a specification, like characters on the drawings representing like parts.

In another application, Serial No. 239,055, filed by me December 30, 1904, an apparatus is shown for feeding oranges and other articles comprising, essentially, a declining chute made wide enough to provide for the simultaneous delivery of several oranges arranged side by side in a row extending transversely across it, a conveyer adapted to receive the oranges a row at a time, and means controlling the delivery of the oranges a row at a time from the chute to the conveyer. In said application the conveyer moves continuously and is constructed and arranged to receive upon it the oranges arranged in a row and in contact with each other, and an intermittingly-operated lifter is provided by which the endmost orange of the row is removed from the conveyer, thereby providing for delivering the oranges intermittingly. In said application means are provided for preventing any of the oranges which are supported by the conveyer from being forced upward and crowded out of the row, a result otherwise liable to happen, and means are also provided for returning the surplus oranges, if any, from the conveyer to the declining chute in case more oranges should be delivered to the conveyer than can be accommodated by it.

In practice I find many objections to the use of a conveyer which is constructed and arranged to receive the oranges in a row in contact with each other; and one of the objects of my present invention is to improve the construction of the conveyer to the end that the oranges while arranged in a row are separated from each other.

Another object of my present invention is to construct the conveyer so as to deliver the oranges singly or intermittingly to a centering device or holder or other thing, although moving continuously, to thereby avoid the necessity of employing a lifter or any other means for removing the endmost orange of the row and also the means for operating said lifter.

In my present invention the conveyer is arranged in front of the declining chute, and by means of a rotating device or other form of controlling device the oranges are delivered from the chute to the conveyer a row at a time notwithstanding said conveyer is moving continuously. In case more oranges should be delivered to the conveyer at a time than can be accommodated by it means are provided for removing the surplus oranges and for returning them to the declining chute; but especial provision, however, is made for retaining a single supplementary orange or, it may be, two supplementary oranges which are superimposed on the row of oranges carried by the conveyer and which are rolled along on top of said row of oranges as the row of oranges moves beneath them until such time as a vacant pocket in the conveyer arrives beneath one of them, if two are provided for, into which it will fall by gravity. In fact, to avoid such a vacancy I may purposely place a single orange on top of the row of oranges which will be rolled along thereon until a vacant pocket arrives beneath it, and in such case if one or more additional or surplus oranges should be delivered to the conveyer before said supplementary orange drops into a vacant pocket such additional or surplus oranges will be returned to the declining chute. Thus provision is made for filling vacant pockets, the object being to avoid a vacancy in any event if possible. Any ordinary number of surplus oranges can be returned easily to the declining chute. Hence the parts are preferably so timed that more oranges will be delivered to the conveyer than can be accommodated by it; but if a vacant pocket still exists in the conveyer then when said vacant pocket arrives at the delivery end thereof no orange will be delivered to the centering device or holder or other thing, and as the apparatus is intended to be used in conjunction with a wrapping-machine constructed and arranged to operate automatically, the operation of the machine being checked by the absence of an orange, such non-delivery of the orange will operate to stop the machine.

Figure 1 shows in side elevation a feeding device for oranges and other articles embodying this invention. Fig. 2 is a plan view of the feeding device shown in Fig. 1. Fig. 3 is a vertical section of the feeding device shown in Fig. 1, taken on the dotted line 3 3. Fig. 4 is a sectional detail of the controlling device by which the oranges are delivered a row at a time to the conveyer. Fig. 5 is an enlarged detail showing in longitudinal section a portion of the conveyer and means for holding two supplementary oranges above the row carried by the conveyer. Fig. 6 is a vertical section of the conveyer shown in Fig. 5, taken on the dotted line 6 6.

The oranges or other articles which are to be fed to a wrapping-machine or other machine are dropped onto a declining chute having a declining bottom wall 400 and a fixed side wall 401 and a movable side wall 402. The side wall 402 has near its lower end a slotted ear 403, through the slot of which a pin 404 passes, which is screwed into any one of a series of holes 405 in the bottom wall, and said side wall has at its upper end a slotted ear 406, which engages any part of a horizontal flange 407, projected from an upright support 408, which is located at the upper end of the declining wall 400. The declining chute is made wide enough to provide for the simultaneous passage of several oranges arranged side by side in a row, and at the lower end of said chute a rotating device is provided adapted to take the endmost row of oranges from the chute and deliver it to a traveling conveyer.

The rotating device consists of a shaft 410, having fixed to it two disks 412 at or near its opposite ends, and several horizontal bars 413, attached at their ends to said disks, three such bars being herein shown, located at equal distances apart, and said disks 412 each have radial slots 414, through which rods 415 freely pass, and said rods 415 extend beyond the disks 412 and pass through curved slots 416, formed in disks 417, two in number, loosely mounted upon the shaft 410 just back of the disks 412, and the ends of said rods are screw-threaded to receive upon them nuts 418. When the nuts are tightened, the loose disks 417 are clamped against the fixed disks 412 and the rods 415 rigidly supported; but whenever said nuts are loosened the disks 417 can be turned on the shaft 410 as an axis and the rods 415 moved along in the curved slots 416, and thereby caused to move along in the radial slots 414 in the fixed disks, being thereby adjusted toward and from the shaft 410. The rods 415 are located in radial planes with the bars 413 and as they are moved in and out will occupy different distances from said bars.

The bars 413 and rods 415 together form the orange-engaging portions of the rotating device, and as the shaft bearing them revolves each orange-engaging portion will take the endmost row of oranges from the chute and deliver it to a conveyer, thereby delivering to the conveyer simultaneously a number of oranges. Radial adjustment of the bars 413 is provided for the purpose of adapting the rotating device to pick off or remove the endmost row of oranges of different sizes.

When the orange-engaging portions are adjusted radially for small oranges—as, for instance, when the rods 415 are set quite close to the bars 413—the lower edge of the bottom wall 400 will terminate too great a distance from said rods 415, if said wall was constructed to terminate close to the path of travel of said rods 415, when moved outward to accommodate the large oranges. Hence the lower end of the bottom wall is made extensible.

420 represents an extension-plate which is attached to a slotted plate 421, through the slot of which passes a screw 422, which secures said plate to the bottom wall 400 and provides for its longitudinal movement. The shaft of the rotating device has secured to it a sprocket-wheel 423, around which passes a sprocket-chain 424, which passes around a sprocket-wheel 425, secured to a shaft 426, bearing a worm-wheel 427, which engages a worm 428, secured to a driving-shaft $w^{13}$. The row of oranges taken from the declining chute passes by gravity from the rotating device onto a declining wall 429 and then down onto the movable conveyer.

The movable conveyer consists of a pair of endless sprocket-chains 430 430, supported upon and moved continuously by two pairs of sprocket-wheels 431 432, which are located at the opposite ends thereof and disposed in approximately the same horizontal plane. The sprocket-wheels turn on horizontal axes, so that the sprocket-chains are disposed in vertical planes and side by side. The sprocket-chains are connected together at regular intervals by cross-bars 433, which are preferably covered or inclosed by rubber or felt or other yielding material, and they are spaced apart sufficiently to provide spaces or recesses each adapted to receive a single orange. By covering the cross-bars with yielding material or otherwise providing yielding cross-bars I obviate bruising the fruit as it is dropped between the cross-bars. Between the chains 430 and at regular intervals apart, at points approximately equidistant between the cross-bars, plates 438 are arranged, having upturned ends 439, which are rigidly secured to the sprocket-chains 430, and therefore incidentally serve as a means for connecting the two sprocket-chains together, and the upturned ends 439 are made long enough to support the plates some little distance from the chains, and they extend inward from the chains to serve as bottom plates for the orange-receiving pockets which are formed by said plates in conjunction with the cross-bars and chains. The endless conveyer is thus provided or formed with a series of orange-receiving pockets arranged at regular intervals thereon. The cross-bars and bottom plates are arranged between and connected to the adjacent sides of the chains, so as to pass between and not engage the sprocket-wheels as the chains are moved along. By rigidly connecting the bottom plates to the chains it will be seen that as the chains pass around the sprocket-wheels the pockets become inverted, and thereby cause or permit the oranges contained therein to fall out as they pass around the sprocket-wheels at the delivery end of the conveyer.

The construction of the endless conveyer herein shown forms the subject-matter of another application, Serial No. 311,677, filed by me April 14, 1906, hence is not herein claimed.

One of the pairs of sprocket-wheels, as 432, is positively driven to continuously move the conveyer, and to accomplish this result said sprocket-wheels are rigidly secured to a shaft 437, to which a sprocket-wheel 434 is rigidly secured, and a sprocket-chain 435 passes around said sprocket-wheel 434 and also around a sprocket-wheel 436, which is secured to the shaft $u^{13}$. The endless conveyer is located in front of the declining chute 400 and moves in a direction at right angles to the movement of the orange passing down said declining chute. The shaft $u^{13}$ has secured to it a beveled gear $n$, which is engaged by a beveled gear $n'$, secured to an oblique shaft $n^2$, which has secured to it a beveled pinion $n^3$, which engages a beveled gear $n^4$, which is secured to the main driving-shaft $f^5$. The endless conveyer is driven continuously and receives the oranges a row at a time from the rotating device or other controlling device, and therefore is timed relative to the movement of said rotating device to present several vacant pockets thereto each time said device delivers a row of oranges, and said continuously-moving endless conveyer delivers the oranges singly as the pockets pass around the sprocket-wheels 432 and are thereby inverted. The oranges as they are delivered singly fall onto a declining chute 448 and then pass to a centering device or holder, which is herein shown as a ring 267, having a set of depending arms $u^8$.

Referring to the means provided for retaining one of more supplementary oranges in proper position to readily enter a vacant pocket in the conveyer, if one should exist, 450 represents a roller, preferably fluted longitudinally, which is located just above and transversely with respect to the endless conveyer, and in such position it is designed to act as a stop to check the onward progress of a supplementary orange. The said roller is secured to a shaft 451, which has its bearings at one end of an arm 452, the opposite end of which is pivoted to a bracket 453, secured to the frame. The fluted roller hence extends laterally from one side of said pivoted arm 452. The pivoted arm 452 is held down by means of a spring, so that the roller will be supported with a yielding pressure at a suitable elevation above the conveyer, and, as herein shown, an upright pin 454 extends through the pivoted arm 452, the lower end of which extends downward and is pivotally or otherwise attached at 455 to one of the side walls between which the conveyer moves, and the upper end extends upward and is surrounded by a spiral spring 456, the lower end of which bears upon or against the arm 452 and acts to press said arm down against a nut on the pin and the upper end of which bears against a nut 457 on the pin. The shaft 451 of the roller has secured to it a belt-pulley, around which a belt 458 passes, which also passes around a belt-pulley on the pivot-shaft of the arm, and another belt-pulley is also secured to said pivot-shaft, around which a belt 459 passes, which passes around a belt-pulley secured to the shaft $u^{13}$, thus providing means for rotating the roller 450. The roller is rotated in the direction of the arrow, Fig. 5, and is supported at a suitable elevation above the conveyer to engage an orange which is superimposed on the row of oranges carried by the conveyer, and the function of said roller is to check the progress of said superimposed or supplementary orange and also turn it, to thereby roll it along as the row of oranges passes beneath it. When a vacant pocket in the conveyer arrives in position beneath the said supplementary orange, it will fall by gravity into said pocket. In practice I prefer to make provision for two such supplementary oranges, and in such case I provide another fluted roller $450^a$, which is supported by a pivoted arm $452^a$ and rotated by means of a belt $458^a$, all constructed substantially the same as the corresponding parts hereinbefore described. The arm $452^a$ is pivoted to the extremity of the arm 452. The second supplementary orange, which is superimposed on the row carried by the conveyer, engages the roller $450^a$. Thus provision is made for two supplementary oranges to be used to fill the vacant pockets. With the two supplementary oranges in engagement with the two rollers, the next surplus orange which is delivered to the conveyer will be carried along by the conveyer until it strikes the first supplementary orange, which is being turned by the roller 450, and as said orange is being turned by the roller the orange which moves into engagement with it will tend to crowd it along and, assisted by the roller, will cause it to pass over the roller. The orange which thus engaged and pushed along the supplementary orange will then become the supplementary orange. The orange which passed over the roller then moves along into engagement with the second supplementary orange and crowds it against the roller 450ª and by the assistance of said roller causes said supplementary orange to pass over said roller, and the orange which has thus pushed the second supplementary orange along then becomes the second supplementary orange. In this manner the surplus oranges are removed from the conveyer, leaving one or more supplementary oranges for the purpose of filling any vacant pockets in the conveyer which may exist.

The surplus oranges are removed and returned to the declining chute from whence they came, and to accomplish this result a trough or receptacle 470 is located in front of the roller 450ª, which is adapted to receive the oranges passing over said roller, and said trough is disposed transversely and conducts said oranges to a declining trough 460, having a movable bottom 460ª for a portion of its length, and the lower end of said trough terminates adjacent the lower end of an inclined endless belt 461, which is located at the end of the machine and which has several orange-carriers 462 thereon, which take the oranges from the exit of the trough 460 and deliver them to the declining chute 400. The lower end of the endless belt 461 passes around a pulley secured to a shaft 463, having a bevel-gear 464 secured to it, which is engaged by a bevel-gear 465, secured to a shaft 466, to which a sprocket-wheel is secured around which passes a sprocket-chain 467, which passes around a sprocket-wheel secured to the shaft $u^{13}$. The movable bottom 460ª, which extends along a portion of the declining trough 460, is made as a wide belt which passes over two drums, one of which is mounted idly on the shaft $u^{13}$, and the other is secured to a shaft 461ª, and to said shaft 461ª a sprocket-wheel 462ª is secured, which is engaged and driven by the sprocket-chain 435. It will thus be seen that the surplus oranges are easily removed and returned to the declining chute, so that even though the parts are so timed as to purposely provide surplus oranges to fill any vacant pockets which may exist in the conveyer the operation of the feeding device will not be affected.

Having thus described my invention, what I claim as new, and desire to secure by Letters Patent, is—

1. In a machine for feeding oranges and other articles, the combination of a declining chute made wide enough to provide for the simultaneous delivery of several oranges arranged side by side in a row extending transversely across it, means for controlling the delivery of the oranges therefrom, a row at a time, a conveyer having pockets, and means for moving it to bring the pockets thereof into position to receive the oranges a row at a time, substantially as described.

2. In a machine for feeding oranges and other articles, the combination of a declining chute, made wide enough to provide for the simultaneous delivery of several oranges, arranged side by side in a row, extending transversely across it, a rotating device controlling the delivery of the oranges therefrom, a row at a time, a conveyer having pockets, and means for moving it relative to the rotating device to bring the pockets thereof into position to receive the oranges a row at a time, substantially as described.

3. In a machine for feeding oranges and other articles, the combination of a declining chute made wide enough to provide for the simultaneous delivery of several oranges, arranged side by side in a row extending transversely across it, a conveyer having pockets, a rotating device adapted to receive the endmost row of oranges from said chute and to deliver the same to the conveyer, and means for moving said conveyer relative to the rotating device to bring the pockets thereof into position to receive the oranges from said rotating device, substantially as described.

4. In a machine for feeding oranges and other articles, the combination of a declining chute made wide enough to provide for the simultaneous delivery of several oranges arranged side by side in a row extending transversely across it, a conveyer having pockets, moving at right angles thereto, means for controlling the delivery of the oranges, a row at a time from the chute to the conveyer and means for moving the conveyer relative to the controlling means to bring the pocket thereof into position to receive the oranges a row at a time, substantially as described.

5. In a machine for feeding oranges and other articles, the combination of a declining chute made wide enough to provide for the simultaneous delivery of several oranges arranged side by side in a row extending transversely across it, an endless conveyer having pockets, passing around sprocket-wheels, a chute leading from one end of said conveyer into which the oranges fall as the pockets are inverted when passing around the sprocket-wheels, and means for moving said conveyer, substantially as described.

6. In a machine for feeding oranges and other articles, the combination of a conveyer having pockets, means for delivering oranges thereto, and means for holding one or more supplementary oranges in position to enter a vacant pocket in said conveyer, substantially as described.

7. In a machine for feeding oranges and other articles, the combination of a conveyer having pockets, means for delivering oranges thereto, and means for holding one or more supplementary oranges above the conveyer in position to drop into a vacant pocket therein when said vacant pocket arrives beneath it, substantially as described.

8. In a machine for feeding oranges and other articles, the combination of a conveyer having pockets, means for delivering oranges thereto, and means for supporting one or more supplementary oranges on top of the row of oranges carried by the conveyer, substantially as described.

9. In a machine for feeding oranges and other articles, the combination of a conveyer having pockets, means for delivering oranges thereto, and means for supporting one or more supplementary oranges on top of the row of oranges carried by the conveyer and for turning them, substantially as described.

10. In a machine for feeding oranges and other articles, the combination of a conveyer having pockets, means for delivering oranges thereto, and means for independently supporting supplementary oranges on top of the row of oranges carried by the conveyer and for continuously turning them, substantially as described.

11. In a machine for feeding oranges and other articles, the combination of a conveyer having pockets, means for delivering oranges thereto, side walls for holding one or more supplementary oranges on top of the row of oranges carried by the conveyer, a stop for checking the progress of each supplementary orange, whereby each supplementary orange is held at a predetermined point, substantially as described.

12. In a machine for feeding oranges and other articles, the combination of a conveyer having pockets, means for delivering oranges thereto, side walls for holding one or more supplementary oranges on top of the row of oranges carried by the conveyer, a rotating stop for checking the progress of each supplementary orange and for turning it, substantially as described.

13. In a machine for feeding oranges and other articles, the combination of a conveyer having pockets, means for delivering oranges thereto, side walls for holding one or more supplementary oranges on top of the row of oranges carried by the conveyer, a stop for checking the progress of each supplementary orange, made of considerable less height than the diameter of the orange which engages it, substantially as described.

14. In a machine for feeding oranges and other articles, the combination of a conveyer having pockets, means for delivering oranges thereto, side walls for holding one or more supplementary oranges on top of the row of oranges carried by the conveyer, a rotating stop for checking the progress of each supplementary orange and for turning it, made of less diameter than the diameter of the orange which engages it, and so located with respect to the oranges as to permit the orange to pass over it, substantially as described.

15. In a machine for feeding oranges and other articles, the combination of a conveyer having pockets, means for delivering oranges thereto, side walls for holding one or more supplementary oranges on top of the row of oranges carried by the conveyer, a rotating fluted roller for each supplementary orange, extending transversely across the path of progress of said supplementary oranges, which checks their progress and also turns them, substantially as described.

16. In a machine for feeding oranges and other articles, the combination of a conveyer having pockets, means for delivering oranges thereto, side walls for holding one or more supplementary oranges on top of the row of oranges carried by the conveyer, a rotating fluted roller for each supplementary orange, which checks their progress and also turns them, said roller being made of considerable less diameter than the diameter of the supplementary oranges, substantially as described.

17. In a machine for feeding oranges and other articles, the combination of a conveyer having pockets, means for delivering oranges thereto, side walls for holding one or more supplementary oranges on top of the row of oranges carried by the conveyer, a stop extending transversely across the path of progress of each supplementary orange and a yielding support for said stop, substantially as described.

18. In a machine for feeding oranges and other articles, the combination of a conveyer having pockets, means for delivering oranges thereto, side walls for holding one or more supplementary oranges on top of the row of oranges carried by the conveyer, a roller for each supplementary orange, extended transversely across the path of progress of said supplementary orange, a yielding support for each roller, and means for rotating the rollers to turn the supplementary oranges, substantially as described.

19. In a machine for feeding oranges and other articles, the combination of a conveyer having pockets, means for delivering oranges thereto, means for holding one or more supplementary oranges on top of the row of oranges carried by the conveyer, and means for removing the surplus oranges, substantially as described.

20. In a machine for feeding oranges and other articles, the combination of a conveyer having pockets, means for delivering oranges thereto, means for holding one or more supplementary oranges on top of the row of oranges carried by the conveyer, and means for removing the surplus oranges and for returning them to the means employed for delivering the oranges to the conveyer, substantially as described.

21. In a machine for feeding oranges and other articles, the combination of a conveyer having pockets, means for delivering oranges thereto, means for holding one or more supplementary oranges on top of the row of oranges carried by the conveyer, and a declining chute adapted to receive the surplus oranges, substantially as described.

22. In a machine for feeding oranges and other articles, the combination of a conveyer having pockets, means for delivering oranges thereto, means for holding supplementary oranges on top of the row of oranges carried by the conveyer, a declining chute adapted to receive the surplus oranges, and means for conveying them from said chute to the means employed for delivering them to the conveyer, substantially as described.

23. In a machine for feeding oranges and other articles, the combination of a conveyer having pockets, means for delivering oranges thereto, means for holding one or more supplementary oranges on top of the row of oranges carried by the conveyer, a declining chute adapted to receive the surplus oranges, and a conveyer for returning said oranges to the chute from whence they came, substantially as described.

24. In a machine for feeding oranges and other articles, the combination of a conveyer having pockets, means for delivering oranges thereto, means for holding one or more supplementary oranges in position to enter a vacant pocket in said conveyer, and means for removing the surplus oranges, substantially as described.

25. In a machine for feeding oranges and other articles, the combination of a conveyer having pockets, means for delivering oranges thereto, means for holding one or more supplementary oranges on top of the row of oranges carried by the conveyer, a stop for checking the progress of each supplementary orange over which the oranges may pass, and means for removing the surplus oranges, substantially as described.

26. In a machine for feeding oranges and other articles, the combination of a conveyer having pockets, means for delivering oranges thereto, means for holding one or more supplementary oranges on top of the row of oranges carried by the conveyer, a stop for checking the progress of each supplementary orange over which the oranges may pass, any means for removing the surplus oranges and for returning them to the chute from whence they came, substantially as described.

27. In a machine for feeding oranges and other articles, the combination of a conveyer having pockets, means for delivering oranges thereto, means for holding one or more supplementary oranges on top of the row of oranges carried by the conveyer, a roller for checking the progress of each supplementary orange over which the orange may pass, means for rotating said roller, and a declining chute adapted to receive the surplus oranges, substantially as described.

28. In a machine for feeding oranges and other articles, the combination of a conveyer having pockets, means for delivering oranges thereto, means for holding one or more supplementary oranges on top of the row of oranges carried by the conveyer, a roller for checking the progress of each supplementary orange over which the oranges may pass, means for rotating said roller, a declining chute adapted to receive the surplus oranges and means for conveying the oranges from said chute to the chute from whence they came, substantially as described.

29. In a machine for feeding oranges and other articles, the combination of a declining chute made wide enough to provide for the simultaneous delivery of several oranges arranged side by side in a row extending transversely across it, means for controlling the delivery of the oranges therefrom, a row at a time, a conveyer having pockets, and means for moving it to bring the pockets thereof into position to receive the oranges a row at a time, and to invert the pockets successively to discharge the oranges singly, substantially as described.

In testimony whereof I have signed my name to this specification in the presence of two subscribing witnesses.

MILTON H. BALLARD.

Witnesses:
B. J. NOYES,
H. B. DAVIS.